(12) United States Patent
Sullivan

(10) Patent No.: US 6,772,135 B2
(45) Date of Patent: Aug. 3, 2004

(54) SYSTEMS AND METHODS FOR MONITORING AN APPLICATION PROCESSOR

(75) Inventor: John Sullivan, Glen Allen, VA (US)

(73) Assignee: Capital One Financial Corporation, Falls Church, VA (US)

(*) Notice: Subject to any disclaimer, the term of this patent is extended or adjusted under 35 U.S.C. 154(b) by 426 days.

(21) Appl. No.: 09/989,129

(22) Filed: Nov. 21, 2001

(65) Prior Publication Data

US 2003/0097616 A1 May 22, 2003

(51) Int. Cl.$^7$ ............................................... G06F 17/00
(52) U.S. Cl. ..................................... 706/47; 707/104.1
(58) Field of Search .......................... 706/47; 707/104.1

(56) References Cited

U.S. PATENT DOCUMENTS 6,530,024 B1 * 3/2003 Proctor ....................... 713/201
6,704,612 B1 * 3/2004 Hahn-Carlson ............. 700/213
2002/0007302 A1 * 1/2002 Work et al. ................... 705/10
2002/0026507 A1 * 2/2002 Sears et al. ................. 709/224
2003/0050936 A1 * 3/2003 Wainwright ............. 707/104.1

* cited by examiner

*Primary Examiner*—George B. Davis
(74) *Attorney, Agent, or Firm*—Finnegan, Henderson, Farabow, Garrett & Dunner, LLP

(57) ABSTRACT

Systems and methods are provided for monitoring an application processor, such as an application processor for processing applications submitted by consumers. In accordance with an embodiment of the invention, a system is provided that, for example, includes a configuration tool for configuring an audit used to verify whether the application processor correctly invoked a processing rule. The application processor invokes such a processing rule to determine what action to take with respect to a particular application. An audit engine then searches a set of application data generated by the application processor to identify, based on the configured audit, application data where the application processor correctly invoked the processing rule. An output report generator then generates report data reflecting whether the application data correctly invoked the processing rule.

20 Claims, 5 Drawing Sheets

| Audit Summary Screen for Solicitation 5354 | | | | | |
|---|---|---|---|---|---|
| Solicitation: 5354 | Region: QCAPR | User Name: keegan | | Date Run Against: | Date Entered Capstone |
| From: 09/26/2001 | Until: 09/27/2001 | TCs run: 22-40 | | | |

Session Summary

| Statistics | Totals |
|---|---|
| Number of Apps Dropped | 72 |
| Number of Audits Selected | 34 |
| Total Number of Examples | 3285 |
| Total Number of Exceptions | 5 |

Status Information

| Status | Number Of Apps |
|---|---|
| 5200_ManualReview | 5 |
| 5250_Development | 66 |
| 8100_PendLetter | 1 |

Audit Summary

| Audit | Scenario | Examples | Exceptio... |
|---|---|---|---|
| Letter Type and LIR Audit | | | |
| | Letter and Letter Insert Reasons are correct | 0 | |
| | Letter correct, letter insert reasons not correct | | 0 |
| | Letter not correct, letter insert reasons correct | | 0 |

Print   Next >   Cancel

FIG. 3C

SYSTEMS AND METHODS FOR MONITORING AN APPLICATION PROCESSOR

BACKGROUND OF THE INVENTION

I. Field of the Invention

The present invention relates to systems and methods for monitoring an application processor and, more particularly, to systems and methods for monitoring the processing of applications for a financial product.

II. Background Information

Financial institutions, including those offering credit card accounts, financial loans, and other financial products, process thousands of applications a day. To process such a large number of applications, a financial institution may use an automated application processor that automates the process of accepting, analyzing, approving, and rejecting of new applications received from consumers. One such application processor is the Capstone Decision Manager offered by HNC Software, Inc. of San Diego, Calif. Such application processors are rule-based systems that invoke processing rules to determine what action to take on an application based on the information provided by the consumer.

For instance, a consumer may have been offered via a directed mailing campaign a credit card product having a particular credit limit. The application for that credit card product may allow the consumer to select a desired credit limit as long as the desired credit limit is less than or equal to the offered credit limit. In this case, the application processor may include a rule that rejects applications in which a credit limit desired by the consumer is greater than that originally offered. The rule may further define that a particular type of letter should be sent to the consumer based on, for example, whether the application was denied because the consumer requested a credit limit that was too high.

While application processors can streamline the processing of applications for a company, it is not uncommon for an application processor to make mistakes during the processing of applications. For example, an application processor may not correctly invoke a processing rule because the rule was configured incorrectly. Since configuring certain processing rules can become an arduous and complex task, incorrectly configured rules can occur frequently.

Erroneously processed applications can be especially detrimental for a financial institution offering a particular financial product. For example, if a financial institution mistakenly approves a consumer having a poor credit rating for a credit card, then the financial institution will expose itself to excess risk of default by that consumer. Conversely, if the financial institution mistakenly denies a consumer a credit card, then the financial institution loses the revenue that it would have generated from that credit card account. In addition, federal consumer credit laws also place standards on financial institutions to fairly and accurately process credit card applications submitted by consumers.

Thus, there is a need for systems and methods that can monitor the accuracy of an application processor to ensure that the automated processing is achieving acceptable standards. Moreover, there is a need for systems and methods for monitoring a rule-based application processor which can identify which rules are invoked incorrectly so that an institution can take appropriate corrective measures.

SUMMARY OF THE INVENTION

Systems and methods consistent with embodiments of the present invention monitor the processing of an application processor, including the processing of applications for a financial product. Further, consistent with embodiments of the invention, systems and methods may be provided to monitor a rule-based application processor to determine the accuracy of the application processor when it invokes various processing rules.

In accordance with an embodiment of the invention, a system is provided for monitoring an application processor. The system, for example, includes a configuration tool for configuring an audit used to verify whether the application processor correctly invoked a processing rule. The application processor invokes such a processing rule to determine what action to take with respect to a particular application. An audit engine then searches a set of application data generated by the application processor to identify, based on the configured audit, application data where the application processor correctly invoked the processing rule. An output report generator then generates report data reflecting whether the application data correctly invoked the processing rule.

In accordance with a further embodiment of the invention, a method is provided for monitoring an application processor. The method, for example, configures an audit used to verify whether the application processor correctly invoked a processing rule. The application processor invokes the processing rule to determine what action to take with respect to a particular application. The method then searches a set of application data generated by the application processor to identify, based on the configured audit, application data where the application processor correctly invoked the processing rule. The method then generates report data reflecting whether the application data correctly invoked the processing rule.

Both the foregoing general description and the following detailed description are exemplary and are intended to provide further explanation of the embodiments of the invention as claimed.

BRIEF DESCRIPTION OF THE DRAWINGS

The accompanying drawings provide a further understanding of the invention and, together with the detailed description, explain various features and aspects of embodiments of the invention. In the drawings:

FIGS. 3A–3C are exemplary graphical user interfaces, consistent with embodiments of the present invention, that can be implemented with the audit processing system of FIG. 1.

DETAILED DESCRIPTION

Systems and methods consistent with embodiments of the present invention monitor the processing of an application processor, such as a rule-based application processor for processing applications of consumers. In such systems and methods, an audit may be configured for monitoring the performance of the application processor. In embodiments of the present invention, the term "audit" refers to a process verifying that a processing rule invoked by an application processor was invoked correctly. The audit may also be directed to one or more processing rules invoked by the application processor when processing applications. From the configured audit, a list of examples may be created to indicate where a rule under consideration was met by the processed application data. Further, a list of exceptions may be created to indicate where that rule was not met by the processed application data. A user may then use these examples and exceptions to monitor the accuracy of the application processor and to determine where adjustments in the application processor may be necessary to improve accuracy.

Figure 1:
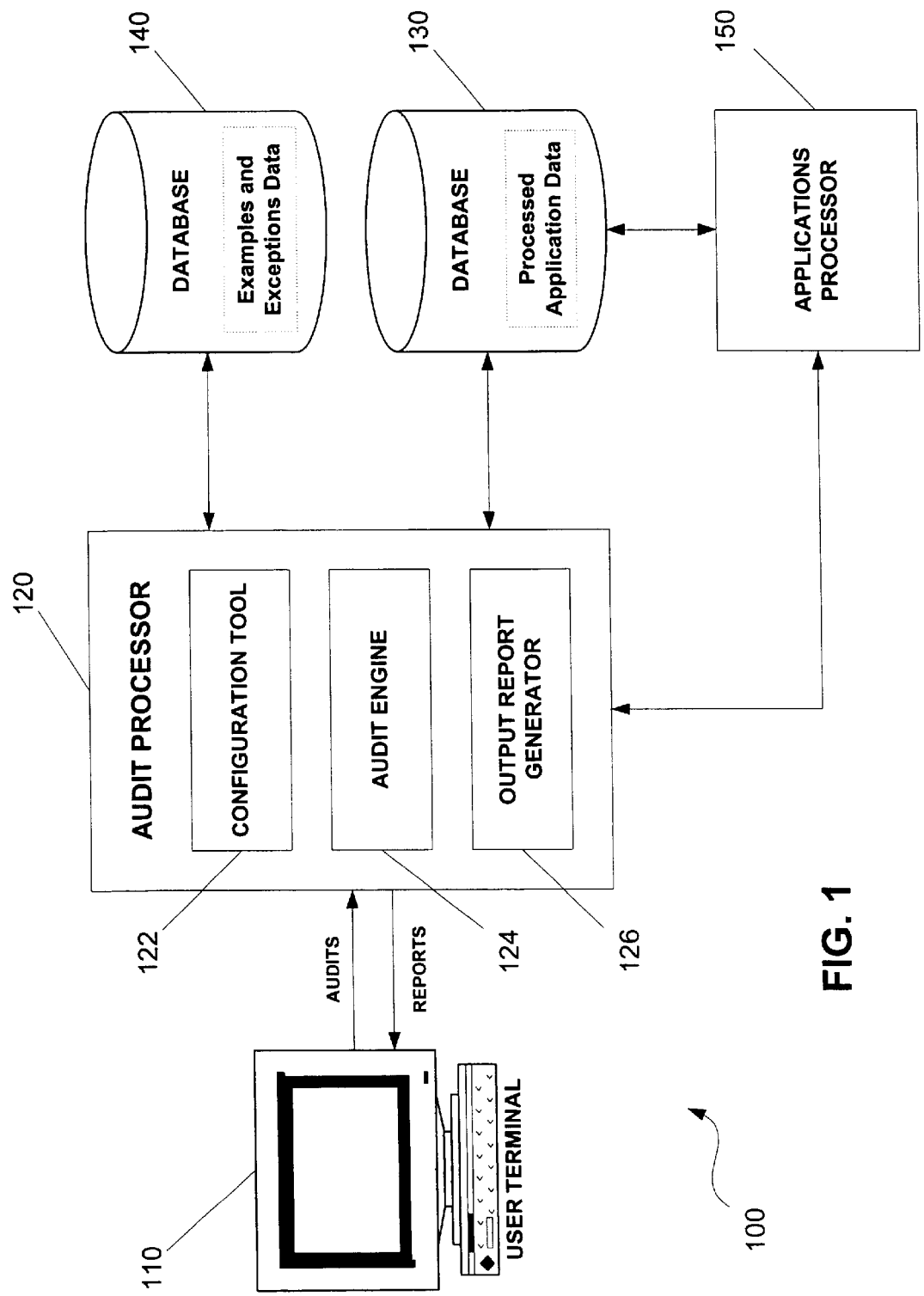
FIG. 1 is a block diagram of an exemplary audit processing system, consistent with embodiments of the present invention.

Embodiments of the present invention will now be described with reference to the accompanying drawings. FIG. 1, for example, shows a block diagram of an exemplary audit processing system 100, consistent with embodiments of the present invention. As illustrated in FIG. 1, system 100 includes a client or user terminal 110 connected to an audit processor 120. Audit processor 120 audits the processed application data stored in database 130 and generates output reports from those audits for storage in database 140. The processed application data stored in database 130 corresponds to data generated by an application processor 150. The report data stored in database 140 may include example and exception data that indicate the accuracy of applications processor 150.

While FIG. 1 shows user terminal 110, audit processor 120, databases 130 and 140, and application processor 150 as separate components, these components may be part of a single computing device or implemented using multiple computing devices connected via a network (public or private, local area network or wide area network), such as an Ethernet, an extranet, or the Internet. Further, while FIG. 1 shows only one user terminal 110, any number of user terminals 110 may be used as part of system 100. By way on non-limiting examples, user terminal 110 may comprise a workstation, a personal computer (such as an IBM-compatible computer), or any other computing-based platform with a connection to audit processor 120. Further, audit processor 120 may be implemented with a server or any other processing-based platform.

Application processor 150 may be implemented with commercially available application processors, such as the Capstone Decision Manager offered by HNC Software, Inc. of San Diego, Calif. Such application processors may be rule-based processors that automate the process of accepting, analyzing, approving, and rejecting of new applications submitted by consumers. For instance, a consumer may have been offered via a directed mailing campaign a credit card product having a particular credit limit. An application for that credit card product may allow the consumer to select a desired credit limit, as long as the desired credit limit is less than or equal to the offered credit limit. In this case, application processor 150 may include a processing rule that rejects applications in which a credit limit desired by the consumer is greater than that originally offered. Application processor 150 may also use other rules to determine what action to take on an application based, for example, on identification information about the consumer (e.g., the consumer's age), financial information about the consumer (e.g., the consumer's credit rating), etc. One skilled in the art will realize though that numerous types of processing rules may be used by application processor 150 to process applications.

Application processor 150 may process the applications for a particular product using a set of processing rules associated with that product or with applications for that product. The application data generated by application processor 150 may be generated or stored in table form. For instance, processor 150 may generate a table listing, for each consumer and for each type of information requested on the application, the actual information provided by the consumer on the application. Other information, such as collected credit information about the consumer, may also be included in the table. Each table may include application data for any number of consumers submitting applications processed by processor 150. During an auditing process, database 130 receives the application data from processor 150 that is to be audited by audit processor 120.

Audit processor 120 may include a number of components, such as a configuration tool 122, an audit engine 124, and an output report generator 126. Configuration tool 122 may be used by a user of user terminal 110 to create and define audits processed by audit processor 122. In systems and methods consistent with embodiments of the present invention, an audit may verify that at least one processing rule invoked by application processor 150 was invoked correctly. Configuration tool 122 preferably includes graphical user interfaces (GUIs) through which the user may configure an audit. In this respect, the user may use a GUI to define the logic of an audit (which may include defining the rule invoked by application processor 150 that corresponds to the audit, defining whether the audit will look for example data representing when processor 150 invoked the rule correctly, or defining whether the audit will look for exception data representing when processor 150 did not invoke the rule correctly). Configuration tool 122 then translates the defined audit logic into a dynamic structured query language (SQL) query to be used on the application data of database 130.

Audit engine 124 runs the audit configured by configuration tool 122. In particular, audit engine 124 may run the dynamic SQL query on the data of database 130. Audit engine 124 then stores the results of that audit in database 140. Output report generator 126 may use the results of the audit performed by audit engine 124 stored in database 140 to prepare reports forwarded to a user at user terminal 110. Both audit engine 124 and output report generator 126 may use GUIs to implement the above features. Finally, it will be appreciated by one skilled in the art that the components and processes of audit processor 120 (including, in particular, configuration tool 122, audit engine 124, and output report generator 126) may be implemented in a variety of ways, including through any combination of software and/or hardware devices, either programmed or dedicated.

Figure 2:
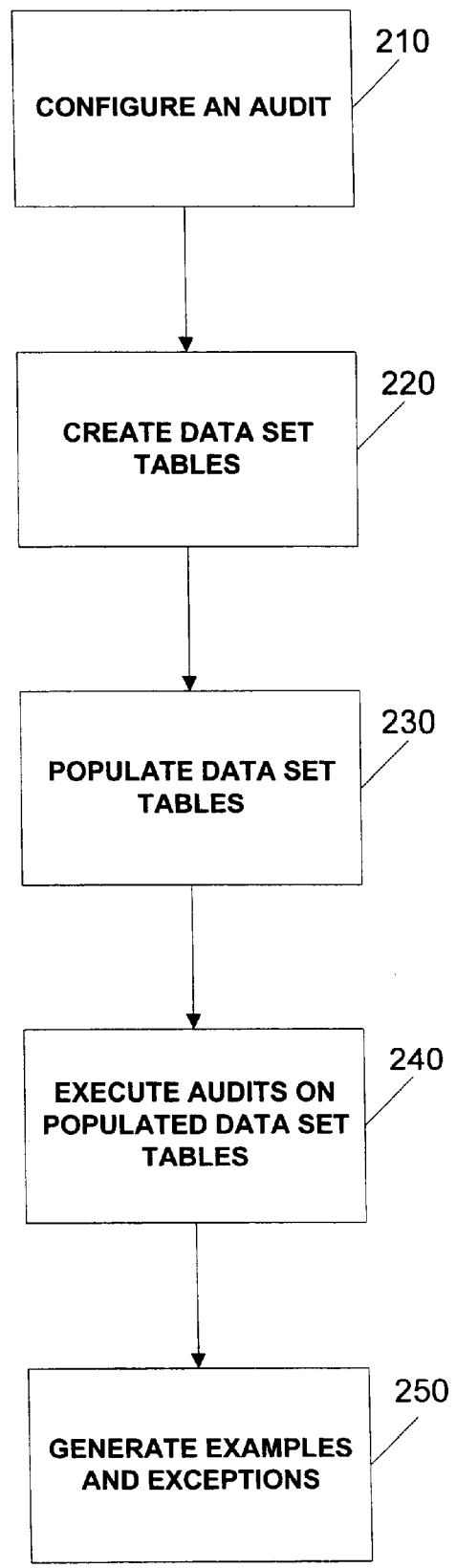
FIG. 2 is a flow diagram of an exemplary method, consistent with embodiments of the present invention, for monitoring an application processor with the audit processing system of FIG. 1.

FIG. 2 illustrates a flow diagram of an exemplary method, consistent with embodiments of the present invention, for monitoring an application processor. The exemplary method of FIG. 2 may be implemented to monitor application processor 150 using audit processing system 100 of FIG. 1.

As shown in FIG. 2, a user first configures or sets-up an audit using configuration tool 122 (step 210). For instance, a user at user terminal 110 may access configuration tool 122 to configure or set-up the audit executed by audit engine 124. This may include at least one of the following: defining the processing rule invoked by application processor 150 that will be monitored through the audit; defining whether the audit will look for example data representing when processor 150 invoked the processing rule correctly; and defining whether the audit will look for exception data representing when processor 150 did not invoke the processing rule correctly. Thus, the audit will be configured to identify such "examples" or "exceptions" associated with instances where application processor 150 invoked a particular processing rule under consideration.

Figure 3A:
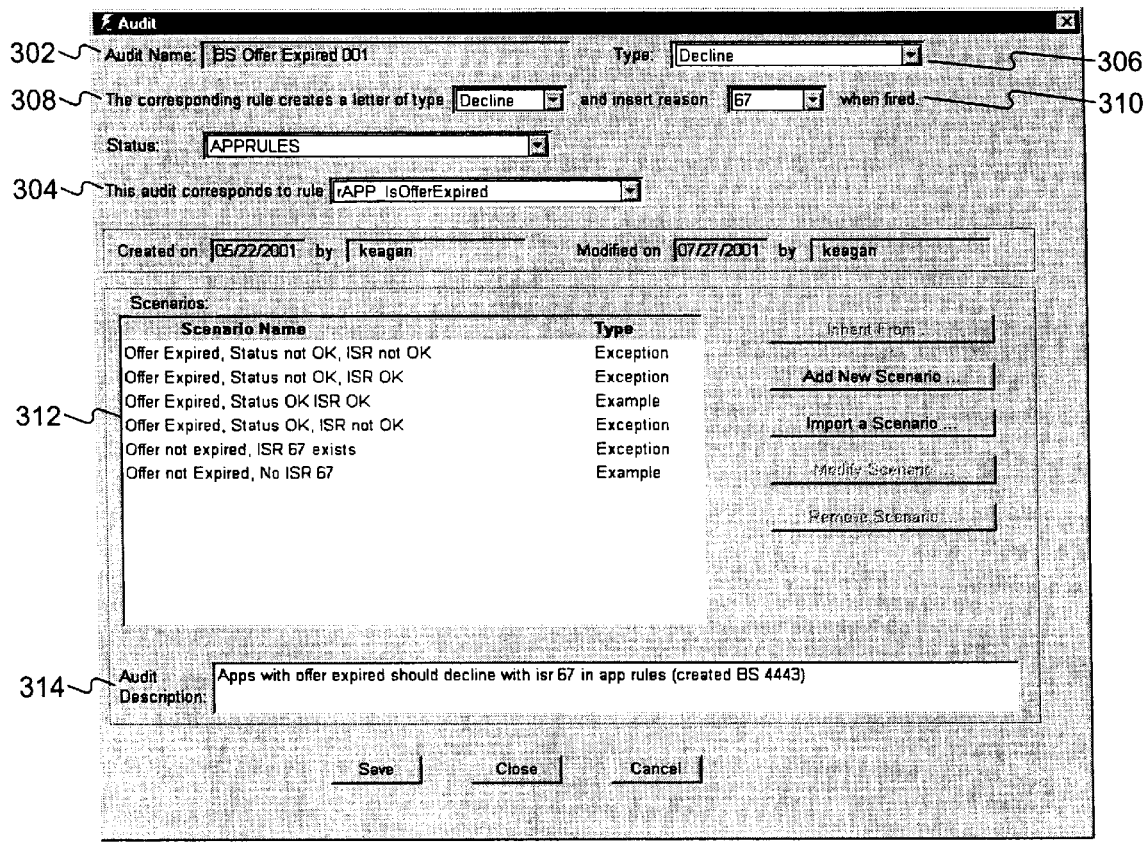

FIG. 3A illustrates an exemplary GUI, consistent with embodiments of the present invention, for allowing a user to configure an audit using configuration tool 122. As shown in FIG. 3A, the GUI may include an entry field 302 for defining the name of the audit, an entry field 304 for defining the processing rule corresponding to the audit and which is invoked by processor 150, entry fields 306, 308, and 310 for defining the type of action taken by application processor 150 when invoking the rule, an entry field 312 for describing the scenarios corresponding to the audit, and an entry field 314 for describing the audit. Field 306 may define a type of action that application processor 150 should have taken when invoking the corresponding application rule. For instance, field 306 may define a rule of the type that sets a value used in subsequent application processing, a rule of the type that sends a letter (e.g., a letter requesting additional information or a decline letter), or a rule of the type that requires manual review by an analyst. For those rule types that send a letter, fields 306 and 308 may be used to further define the type of letters that may be sent out by the invoking of that rule.

The scenarios that a user may enter in entry field 312 represent a possible situation that the application data may be in with respect to the invoking of the rule corresponding to the audit. In other words, any application data meeting the criteria of a scenario will be either application data that is an "example" of when application processor 150 correctly invoked the rule or application data that is an "exception" to when application processor 150 correctly invokes the rule. Thus, for each scenario entered in entry field 312, the user may define whether the scenario type is either an "example" or an "exception." A user preferably creates a scenario for each possible situation the application data may be in upon the invoking of the rule under consideration (regardless of whether or not that rule was invoked correctly).

Figure 3B:
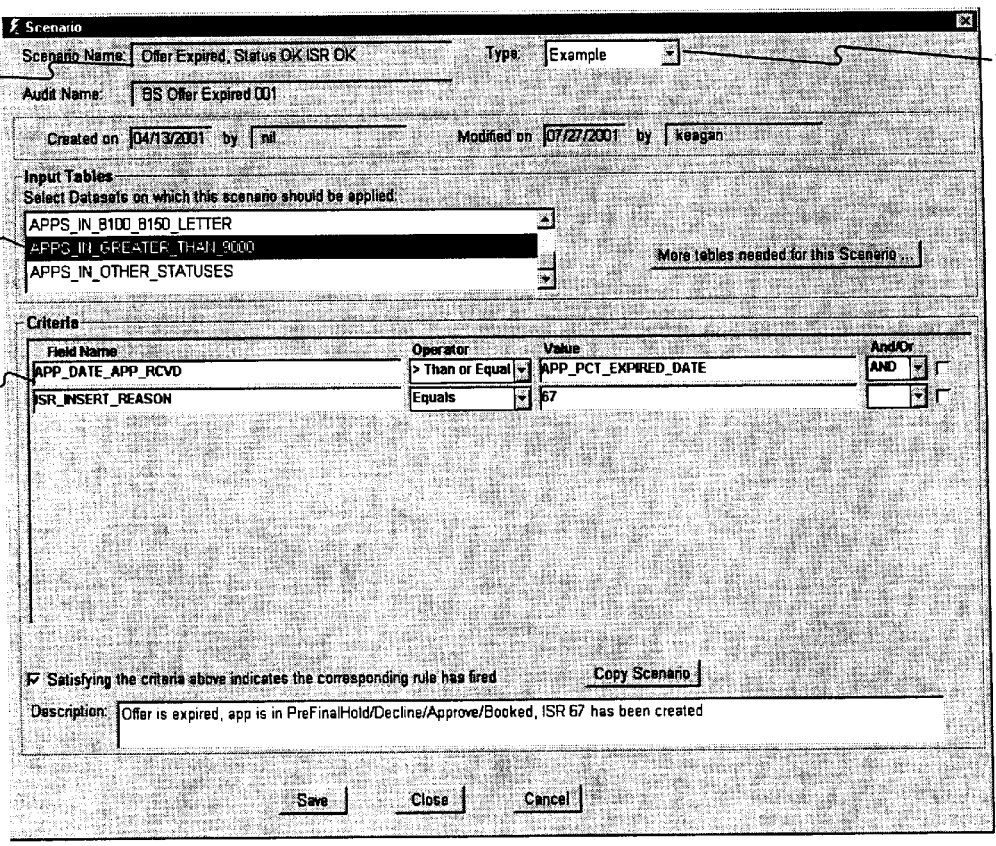

FIG. 3B illustrates an exemplary GUI, consistent with embodiments of the present invention, for allowing a user to configure a scenario for a configured audit. The GUI of FIG. 3B may thus be used to enter the scenario information into entry field 312 of the GUI of FIG. 3A. As shown in FIG. 3B, the GUI may include an entry field 316 for defining the scenario name, an entry field 318 for defining the type of scenario ("example" or "exception"), an entry field 320 for identifying which application data of database 130 the scenario is to be applied, and an entry field 322 for defining the criteria associated with the scenario. In entry field 322, the user may enter criteria that audit engine 124 is to look for when performing the audit. In particular, audit processor 120 converts the criteria entered in field 322 into a dynamic SQL query for searching the application data stored in database 130 for the possible examples or exceptions satisfying that scenario.

For example, consider a processing rule requiring that if the date an application is received is later than an expiration date, then the application is declined. Under such a processing rule, application processor 150 may also cause a letter to be sent including an insert reason (such as insert reason number 67, stating that "the offer has expired") when the application is expired. A number of different scenarios may be created for this rule. Each scenario, as stated above, describes a possible situation the application data may be in upon the invoking of the rule under consideration (regardless of whether or not that rule was invoked correctly). These scenarios can thus be used to determine the accuracy of a processing rule by confirming that the processed application data was acted upon correctly based on their currently assigned situation or status. Exemplary scenarios for the "expired application" processing rule include:

Scenario 1 (Example)—application is expired; decline letter was sent with insert reason 67.
Scenario 2 (Exception)—application is expired; decline letter was not sent with insert reason 67.
Scenario 3 (Example)—application is not expired; decline letter was not sent with insert reason 67.
Scenario 4 (Exception)—application is not expired; decline letter was sent with insert reason 67.

Thus, a user who wishes to audit the application data to determine whether the application processor 150 correctly invoked the above rule would use the GUI of FIG. 3A to configure this audit. The user would then identify the particular rule in field 304, identify the rule is a letter type in field 306, identify the type of letter sent in field 308, and identify the insert reason 67 in field 310. The user may then configure the scenarios for the audit (which will be listed in field 312) by using the GUI of FIG. 3B, for instance. The user may, for example, use the drop-down menu bars of field 322 to define that the criteria searched for by audit engine 124 is for application data where the value for the received application date is greater than the expiration date. The user may do this by: (1) inserting "APP-DATE_APP_RCVD" for the application received date in the field name; (2) selecting the operator "> Than or Equal"; and (3) inserting "APP_PCT_EXPIRED_DATE" for the expiration date as the value. The user may further select the Boolean operator "AND", and then define the further criteria of the scenario, such as that a letter was sent with insert reason 67. The user would then identify this as an example in entry field 318. The other scenarios may be similarly configured using the GUIs of system 100.

After the audit is configured, application processor 120 will create a data table in database 130 (step 220) and populate the table with processed application data retrieved from application processor 150 (step 230). As described above, the user may use configuration tool 122 to select the particular data from application processor 150 that is to be audited. For instance, the user may select application data corresponding to applications submitted by consumers applying for the same product. The selected data is then used to populate the data table in database 130.

Audit engine 124 then executes the audit on the populated data set table in database 130 (step 240). Audit engine 124 may do this by applying the SQL query, created during the configuration process, to the populated data set table. The SQL query will then identify each application data meeting one of the scenarios associated with the audit that the user has defined. In particular, the SQL query may identify each example or exception in the analyzed application data representing whether the rule under consideration was invoked correctly by application processor 150. Further, audit engine 124 may also perform an audit based on a single configured audit or based on a multiple number of audits.

Based on the results of the audit, output report generator 126 then prepares an output report summarizing the results for display by the user at terminal 110 (step 250). FIG. 3C illustrates an exemplary GUI, consistent with embodiments of the present invention, for presenting the results of an audit to the user. As shown in FIG. 3C, the GUI may display the statistics corresponding to the audit. For instance, the GUI may indicate to the user: (1) the number of applications loaded into the system for being audited; (2) the number of configured audits selected for the audit; (3) the total number of identified examples; and (4) the total number of identified exceptions. The GUI of FIG. 3C also identifies in a "status information" display area, the number of applications audited by the system failing within predefined status categories. Further, in an "audit summary" display area, the GUI identifies the number of examples and exceptions for each scenario of each audit performed by the system.

A user can use the list of exceptions and examples for an audit based on a particular processing rule to monitor the accuracy of application processor 150 with respect to that rule. Moreover, for cases where exceptions exist, the user can determine where the coding of that rule in application processor 150 needs to be corrected. In particular, the user may recognize a configuration error of the processing rule based on the occurrence of examples and/or exceptions for a particular scenario. In other words, the occurrence of examples and/or exceptions for a certain scenario will help identify the instances where the processing rule is being invoked correctly and/or incorrectly, and thus how any errors may be corrected.

Therefore, systems and methods consistent with embodiments of the present invention provide a system that can monitor the accuracy of an application processor. Moreover, systems and methods consistent with embodiments of the invention enable a user to determine which rules of the application processor are not accurate and in need of revision.

It will be apparent to those skilled in the art that various modifications and variations can be made to the system and method of the present invention without departing from the spirit or scope of the invention. For example, system 100 may be used to monitor an application processor that processes various types of applications, such as those for a communication carrier service, consumer business loans, personal lines, auto loans, or home equity loans. Further, system 100 may use a batch process to audit batches of processed application data as they are processed. Additionally, although aspects of the present invention are described as being stored in memory, one skilled in the art will appreciate that these aspects can also be stored on other types of computer-readable media, such as secondary storage devices, like hard disks, floppy disks, or CD-ROM, or other forms of RAM or ROM.

Accordingly, embodiments of the present invention cover the modifications and variations of this invention that are within the scope of the appended claims and their equivalents.

What is claimed is:

1. A system for monitoring an application processor, the system comprising:
   a configuration tool for configuring an audit used to verify whether the application processor correctly invoked a processing rule, wherein the processing rule is invoked by the application processor to determine what action to take with respect to a particular application;
   an audit engine that searches a set of application data generated by the application processor to identify, based on the configured audit, application data where the application processor correctly invoked the processing rule; and
   an output report generator for generating report data reflecting whether the application data correctly invoked the processing rule.

2. The system of claim 1, wherein the configuration tool further includes:
   means for configuring the audit to describe a scenario where the application data is an example of when the application processor correctly invoked the processing rule.

3. The system of claim 1, wherein the configuration tool further includes:
   means for configuring the audit to describe a scenario where the application data is an exception of when the application processor correctly invoked the processing rule.

4. The system of claim 1, wherein the configuration tool further includes:
   means for configuring the audit to describe a scenario where the application data is an example of when the application processor correctly invoked the processing rule, and means for configuring the audit to describe a scenario where the application data is an exception of when the application processor correctly invoked the processing rule,
   wherein the configuration tool configures scenarios to reflect each possible situation the application data may be in upon the invoking of the processing rule.

5. The system of claim 1, wherein the configuration tool further includes:
   a first graphical user interface (GUI) through which a user may configure the audit, wherein the first GUI includes:
      a first display component for defining the processing rule invoked by the application processor;
      a second display component for defining a scenario of at least one of where the application data is an example of when the application processor correctly invoked the processing rule and where the application data is an exception of when the application processor correctly invoked the processing rule.

6. The system of claim 5, wherein the first display component further includes an entry field for defining an action taken by the processing rule when it is invoked by the application processor.

7. The system of claim 1, wherein the audit engine uses the configured audit to implement an SQL query to search the set of application data.

8. The system of claim 1, wherein the application processor is a rule-based application processor, and wherein the processing rule defines an action taken.

9. The system of claim 1, wherein the output report generator prepares output data identifying application data that is an example of when the application processor correctly invoked the processing rule and application data that is an exception of when the application processor correctly invoked the processing rule.

10. The system of claim 9, wherein the processing rule is associated with a type of application processed by the application processor.

11. The system of claim 1, wherein the application processor generates application data based on completed applications for a financial product.

12. A method for monitoring an application processor, the method comprising:
   configuring an audit used to verify whether the application processor correctly invoked a processing rule, wherein the processing rule is invoked by the application processor to determine what action to take with respect to a particular application;
   searching a set of application data generated by the application processor to identify, based on the configured audit, application data where the application processor correctly invoked the processing rule; and
   generating report data reflecting whether the application data correctly invoked the processing rule.

13. The method of claim 12, wherein configuring further includes:
   configuring the audit to describe a scenario where the application data is an example of when the application processor correctly invoked the processing rule.

14. The method of claim 12, wherein configuring further includes:

configuring the audit to describe a scenario where the application data is an exception of when the application processor correctly invoked the processing rule.

15. The method of claim 12, wherein configuring further includes:

configuring the audit to describe a scenario where the application data is an example of when the processing rule is correctly invoked, and configuring the audit to describe a scenario where the application data is an exception of when the processing rule is correctly invoked, wherein the configured scenarios reflect each possible situation the application data may be in upon the invoking of the processing rule.

16. The method of claim 12, wherein the set of application data is searched using an SQL query.

17. The method of claim 12, wherein the application processor is a rule-based application processor, and wherein the processing rule defines an action taken.

18. The method of claim 12, wherein generating the report data further includes:

preparing output data identifying application data that is an example of when the processing rule is correctly invoked and identifying application data that is an exception of when the processing rule is correctly invoked.

19. The method of claim 18, wherein the processing rule is associated with a type of application processed by the application processor.

20. The method of claim 12, wherein the application processor generates application data based on completed applications for a financial product.

* * * * *